United States Patent
Ferreira et al.

(10) Patent No.: US 10,862,693 B2
(45) Date of Patent: Dec. 8, 2020

(54) MEETING PASSCODES

(71) Applicant: Hewlett-Packard Development Company, L.P., Houston, TX (US)

(72) Inventors: Ronaldo Rod Ferreira, Porto Alegre (BR); Endrigo Nadin Pinheiro, Porto Alegre (BR); Adilson Arthur Mohr, Porto Alegre (BR); Jose Paulo Xavier Pires, Porto Alegre (BR); Fabio D. Riffel, Porto Alegre (BR); Christopher Charles Mohrman, Spring, TX (US); Valiuddin Y. Ali, Cypress, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/066,406

(22) PCT Filed: Mar. 30, 2016

(86) PCT No.: PCT/US2016/024908
§ 371 (c)(1),
(2) Date: Jun. 27, 2018

(87) PCT Pub. No.: WO2017/171750
PCT Pub. Date: Oct. 5, 2017

(65) Prior Publication Data
US 2019/0007227 A1    Jan. 3, 2019

(51) Int. Cl.
*G06F 15/173* (2006.01)
*G06F 15/16* (2006.01)
(Continued)

(52) U.S. Cl.
CPC .......... *H04L 12/1818* (2013.01); *G06F 21/44* (2013.01); *H04L 9/3226* (2013.01);
(Continued)

(58) Field of Classification Search
CPC . H04L 12/1818; H04L 9/3226; H04L 63/107; H04L 67/16; G06F 21/44; H04W 4/02
(Continued)

(56) References Cited

U.S. PATENT DOCUMENTS 7,822,822 B2 * 10/2010 Sanghavi ............. G06Q 10/109
                                                          709/206
8,224,896 B2 *  7/2012 Knight ................... G06Q 10/10
                                                          370/260
(Continued)

FOREIGN PATENT DOCUMENTS

CN      101772947         7/2010
KR   20120038642 A1       4/2012
(Continued)

OTHER PUBLICATIONS

Meeting Management for the Intelligent Enterprise, Feb. 8, 2016, 2 pages, Available at: https://www.crestron.com/downloads/pdf/spec_sheets/commercial_and residential/pinpoint-app.pdf.

*Primary Examiner* — Melvin H Pollack
(74) *Attorney, Agent, or Firm* — Brooks Cameron & Heubsch (57) ABSTRACT

Example implementations relate to meeting passcodes. In an example, meeting passcodes can employ a meeting hub including an antenna and a controller coupled to the antenna to wirelessly receive, via the antenna, information including a first meeting passcode from a meeting device, generate a second meeting passcode in response to receipt of the first meeting passcode, cause the second meeting passcode to be sent to a registered user of meeting device, and admit the meeting device to a meeting using the second meeting passcode.

18 Claims, 4 Drawing Sheets

(51) Int. Cl.
*H04L 12/18* (2006.01)
*H04L 9/32* (2006.01)
*G06F 21/44* (2013.01)
*H04L 29/06* (2006.01)
*H04L 29/08* (2006.01)
*H04W 4/02* (2018.01)
*H04W 12/06* (2009.01)

(52) U.S. Cl.
CPC ............ *H04L 63/107* (2013.01); *H04L 67/16* (2013.01); *H04W 4/02* (2013.01); *H04W 12/06* (2013.01); *H04L 12/1822* (2013.01); *H04L 2209/80* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 8,296,379 | B2 * | 10/2012 | Chen | G06Q 10/109 709/204 |
| 8,401,522 | B2 * | 3/2013 | Crawford | G06F 21/31 455/411 |
| 8,416,935 | B2 * | 4/2013 | Coleman | H04M 3/56 379/202.01 |
| 8,457,019 | B2 * | 6/2013 | Bonkowski | H04L 67/38 370/260 |
| 8,482,593 | B2 * | 7/2013 | Periyannan | H04N 7/152 348/14.08 |
| 8,498,395 | B2 * | 7/2013 | Ramanathaiah | H04M 3/56 379/202.01 |
| 8,515,761 | B2 * | 8/2013 | Agrawal | H04M 3/568 704/270 |
| 8,611,521 | B2 * | 12/2013 | Aldrey | H04M 3/42161 379/204.01 |
| 8,654,953 | B2 * | 2/2014 | Boss | H04M 3/56 348/14.08 |
| 8,761,364 | B2 * | 6/2014 | Koul | H04L 65/403 379/202.01 |
| 8,798,252 | B2 | 8/2014 | Krantz et al. | |
| 8,831,198 | B1 | 9/2014 | Abraham | |
| 8,838,689 | B2 * | 9/2014 | Chen | G06Q 10/10 370/216 |
| 8,855,284 | B2 * | 10/2014 | Block | H04M 7/0054 379/158 |
| 8,861,702 | B2 * | 10/2014 | Simoes | H04M 3/42059 348/14.09 |
| 8,866,872 | B2 * | 10/2014 | Couse | H04L 12/1818 348/14.08 |
| 8,914,734 | B2 * | 12/2014 | Narayanaswamy | H04L 65/403 715/751 |
| 8,935,633 | B2 * | 1/2015 | Bush | G06F 21/6209 709/207 |
| 8,942,683 | B2 * | 1/2015 | Doerr | H04W 4/16 455/416 |
| 8,955,048 | B2 * | 2/2015 | Uchida | H04L 63/08 726/3 |
| 8,958,783 | B2 | 2/2015 | Soundrapandian et al. | |
| 9,065,665 | B1 | 6/2015 | Fritz | |
| 9,111,258 | B2 * | 8/2015 | Bell | H04L 12/1818 |
| 9,118,809 | B2 * | 8/2015 | Anderson | H04L 65/1069 |
| 9,159,037 | B2 * | 10/2015 | Mezhibovsky | G06Q 10/00 |
| 9,166,979 | B2 * | 10/2015 | Hoard | H04L 63/0428 |
| 9,215,414 | B2 * | 12/2015 | Aziz | H04N 7/152 |
| 9,232,068 | B2 * | 1/2016 | Wu | H04M 3/42059 |
| 9,298,344 | B2 * | 3/2016 | Gupta | G06F 3/04812 |
| 9,325,749 | B2 * | 4/2016 | Bangor | H04L 12/1818 |
| 9,369,673 | B2 * | 6/2016 | Ma | H04N 7/147 |
| 9,407,869 | B2 * | 8/2016 | Goesnar | H04L 12/1818 |
| 9,525,711 | B2 * | 12/2016 | Ackerman | H04L 65/4076 |
| 9,608,832 | B1 * | 3/2017 | Shukla | H04M 3/565 |
| 9,609,514 | B2 * | 3/2017 | Mistry | H04W 12/06 |
| 9,674,238 | B2 * | 6/2017 | Krishna | H04L 65/403 |
| 9,871,801 | B2 * | 1/2018 | Singh | H04L 63/102 |
| 10,013,668 | B2 * | 7/2018 | Straub | H04L 63/12 |
| 10,033,726 | B2 * | 7/2018 | Arai | H04L 12/1818 |
| 10,033,874 | B2 * | 7/2018 | Bargetzi | H04W 4/80 |
| 10,044,871 | B2 * | 8/2018 | Bargetzi | G06Q 10/10 |
| 10,063,609 | B2 * | 8/2018 | Leung | H04L 65/403 |
| 10,074,078 | B2 * | 9/2018 | Siegel | G06Q 10/107 |
| 10,122,769 | B1 * | 11/2018 | Tuculescu | H04L 61/307 |
| 10,148,821 | B2 * | 12/2018 | Contreras | H04M 3/56 |
| 10,169,727 | B2 * | 1/2019 | Hurst | G06Q 10/06311 |
| 10,210,484 | B2 * | 2/2019 | Bostick | G06Q 10/1095 |
| 10,243,786 | B2 * | 3/2019 | Rjeili | H04L 43/04 |
| 10,311,383 | B2 * | 6/2019 | Holmes | G06Q 10/02 |
| 10,373,121 | B2 * | 8/2019 | Chen | G06F 16/958 |
| 10,419,514 | B2 * | 9/2019 | Straub | H04W 12/06 |
| 10,510,026 | B1 * | 12/2019 | Adamson | G06F 9/543 |
| 10,554,694 | B2 * | 2/2020 | Klein | H04L 65/1073 |
| 10,609,084 | B2 * | 3/2020 | Pashman | H04L 12/185 |
| 10,628,800 | B2 * | 4/2020 | Moran | G06Q 10/1095 |
| 2004/0044673 | A1 * | 3/2004 | Brady | G06Q 10/10 |
| 2006/0195519 | A1 | 8/2006 | Slater et al. | |
| 2006/0200519 | A1 * | 9/2006 | Clement | H04M 3/42221 709/204 |
| 2008/0222713 | A1 | 9/2008 | Barnabo et al. | |
| 2009/0259718 | A1 * | 10/2009 | O'Sullivan | G06Q 10/10 709/204 |
| 2010/0146499 | A1 * | 6/2010 | Bush | H04L 63/104 717/178 |
| 2010/0189243 | A1 * | 7/2010 | Miller | H04M 3/56 379/202.01 |
| 2011/0135082 | A1 | 6/2011 | Lingafelt | |
| 2012/0185291 | A1 * | 7/2012 | Ramaswamy | H04L 12/1818 705/7.19 |
| 2012/0246229 | A1 * | 9/2012 | Carr | H04L 12/1818 709/204 |
| 2012/0322376 | A1 | 12/2012 | Couse | |
| 2013/0027505 | A1 | 1/2013 | Ranganath et al. | |
| 2013/0237240 | A1 | 9/2013 | Krantz et al. | |
| 2013/0251125 | A1 | 9/2013 | Deluca | |
| 2014/0349696 | A1 * | 11/2014 | Hyde | H04W 24/02 455/517 |
| 2015/0006218 | A1 * | 1/2015 | Klemm | G06Q 10/1095 705/7.19 |
| 2015/0106146 | A1 * | 4/2015 | Higaki | G06Q 10/1095 705/7.19 |
| 2015/0109897 | A1 * | 4/2015 | Lee | H04W 48/10 370/216 |
| 2015/0163066 | A1 * | 6/2015 | DeRosa | H04L 12/1818 370/250 |
| 2015/0220888 | A1 * | 8/2015 | Iyer | G06Q 10/1095 705/7.19 |
| 2015/0264314 | A1 * | 9/2015 | Goesnar | H04L 12/1818 348/14.08 |
| 2016/0095140 | A1 * | 3/2016 | Gupta | H04W 4/023 370/252 |
| 2016/0119315 | A1 * | 4/2016 | Uzelac | H04L 65/103 726/9 |
| 2016/0269989 | A1 * | 9/2016 | Komine | H04L 63/0876 |
| 2016/0378422 | A1 * | 12/2016 | Kenjalkar | H04L 65/1089 726/6 |
| 2017/0061092 | A1 * | 3/2017 | Baratpour | G06F 21/6245 |
| 2017/0104763 | A1 * | 4/2017 | Jain | H04L 63/08 |
| 2017/0149980 | A1 * | 5/2017 | Aberg | H04M 3/42348 |
| 2017/0323273 | A1 * | 11/2017 | Meek | G06Q 10/1095 |
| 2018/0374164 | A1 * | 12/2018 | Ozog | G06Q 30/0269 |
| 2019/0333025 | A1 * | 10/2019 | Adamson | G06Q 10/063116 |

FOREIGN PATENT DOCUMENTS

| | | |
|---|---|---|
| KR | 101602894 B1 | 3/2016 |
| WO | WO-2014062509 A1 | 4/2014 |

* cited by examiner

MEETING PASSCODES

BACKGROUND

Computing devices (e.g., a mobile phone, a personal computer, etc.) can be connected to a system using communication devices. Communication devices may include different types of antenna (e.g., a Bluetooth antenna) to communicate with a computing device.

DETAILED DESCRIPTION

A conference meeting system may invite users and allow the invited users to join a conference meeting. Invited users may use their own computing devices (e.g., a personal computer, and/or a smart phone, etc.) to join the conference meeting. The conference meeting system may include a conference system that initiates invitations and communicates with computing devices such as computing devices of the invited users.

Electronic meeting devices may allow a user to join a conference meeting system and/or facilitate a conference meeting system. For example, some electronic meeting devices may rely on a user to manually enter a meeting passcode such as a personal identification number (PIN) to join a meeting and/or rely on visually displaying a meeting passcode on a public/common screen to facilitate a user to join the conference meeting. However, in such approaches a person that is not invited to the conference meeting may undesirably be able to view the publicly displayed meeting passcode and/or join a conference meeting they are not invited to.

Accordingly, the disclosure is directed to meeting passcodes. Meeting passcodes can, for example, employ a meeting hub including an antenna and a controller coupled to the antenna to wirelessly receive, via the antenna, information including a first meeting passcode from a meeting device, generate a second meeting passcode in response to receipt of the first meeting passcode, cause the second meeting passcode to be sent to a registered user of meeting device, and admit the meeting device to a meeting using the second meeting passcode. Notably, meeting passcodes, as described herein, can eliminate manual entry and/or public display of a meeting passcode while providing a desired amount of security at least in part due to using multiple meeting passcodes.

Figure 1:
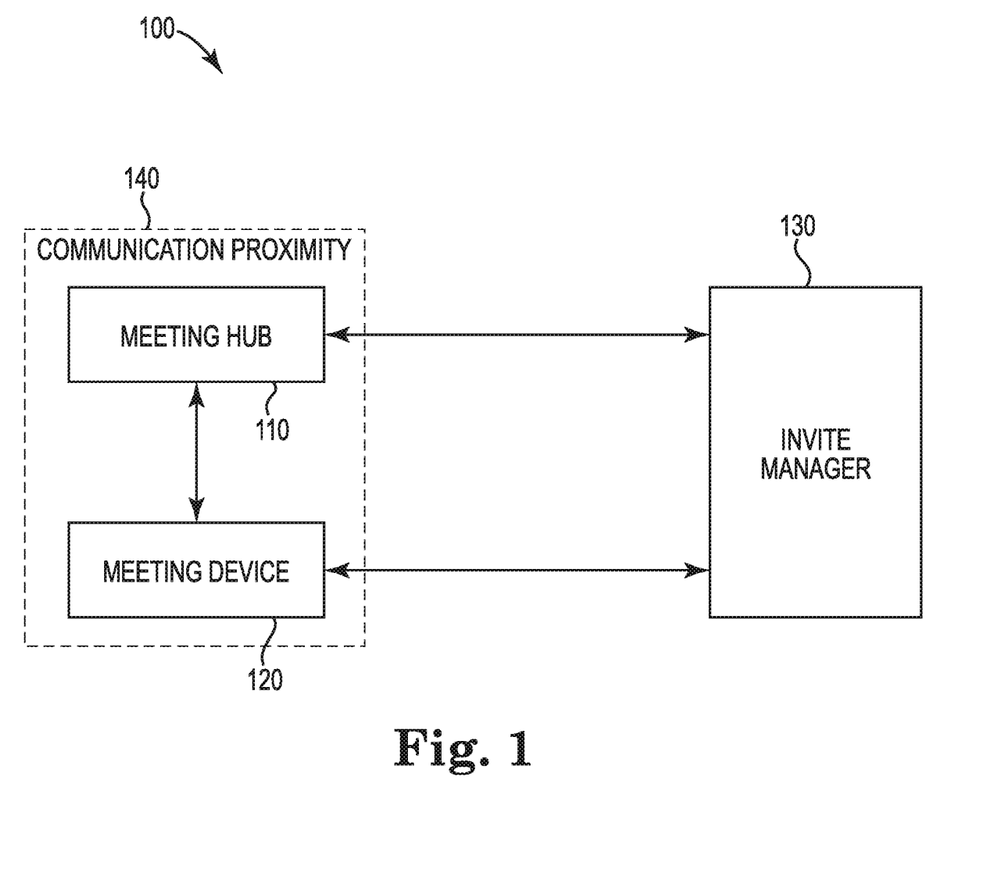
FIG. 1 illustrates a diagram of an example of a system according to the disclosure.

FIG. 1 illustrates a diagram of an example of a system 100 according to the disclosure. As illustrated in FIG. 1, the system 100 can include a meeting hub 110, a meeting device 120, and an invite manager 130. The meeting hub 110 and the meeting device 120 refer to computing devices suitable to communicate with other components of the system 100. Examples of suitable computing devices can include a smartphone, handheld computer, personal digital assistant, carputer, wearable computer, laptop, tablet computer, and/or laptop/tablet hybrids, etc.

The meeting hub 110 can include an antenna and a controller coupled to the antenna to wirelessly receive, via the antenna, information including a first meeting passcode, generate a second meeting passcode in response to receipt of the first meeting passcode, cause the second meeting passcode to be sent to a registered user of meeting device 120, and admit the meeting device 120 to a meeting using the second meeting passcode, as described herein.

In some examples, the meeting hub 110 can request from the first meeting passcode from the meeting device 120 upon detecting the meeting device 120 in a wireless communication proximity 140 of the meeting hub 110. For example, the meeting hub 110 can request the meeting device 120 the first meeting passcode that the meeting device 120 received along with an invitation sent to the meeting device 120, as described herein. Although examples are not limited so, the communication proximity can refer to a particular distance and/or line of sight within which the meeting hub 110 can detect an object. For example, the meeting hub 110 can detect the meeting device 120 when the meeting device 120 approaches to a conference room where the meeting hub 110 is located.

In various examples, the meeting hub 110 can cause an entity that is different from the meeting hub 110 to send the second meeting passcode to the meeting device 120. For example, the meeting hub 110 can send the second meeting passcode to a different entity and cause the second meeting passcode to be sent to the registered user of meeting device 120 via the entity. In various examples, the different entity can be the invite manager 130.

The meeting device 120 can include an antenna and a controller to wirelessly advertise, via the antenna, information including a first meeting passcode for detection by a meeting hub 110, send the first meeting passcode to the meeting hub 110 in response to a request from the meeting hub 110, receive a second meeting passcode generated by the meeting hub 110 in response to confirmation by the meeting hub 110 that the first meeting passcode is valid, and request an authorization from the meeting hub 110 that authorizes the meeting device 120 to send the second meeting passcode to the meeting hub 110, as described herein. In response of the authorization, the meeting device 120 can wirelessly send the second meeting passcode to the meeting hub 110.

In some examples, the meeting device 120 can use a meeting identification code (ID) that the meeting device 120 received along with the invitation to advertise the meeting device 120 to be detected to the meeting hub 110. In some examples, the meeting device 120 can use the first meeting passcode that the meeting device 120 received along with the invitation to advertise the meeting device 120 to be detected to the meeting hub 110, as described herein.

In various examples, instructions (e.g., a smartphone application) can be installed in the meeting device 120 to communicate with the meeting hub 110 and the invite manager 130. For example, the meeting device 120, via execution of the instructions, may notify the user that the meeting device 120 is detected by the meeting hub 110 and request authorization to join the meeting when the second meeting passcode is received, as described herein. In another example, the meeting device 120, via execution of the instructions, can continuously communicate with the invite manager 130 to be responsive to any modification to the meeting or information that the invite manager 130 may send and/or receive.

In various examples, the invite manager 130 can initiate the invitation to the meeting. For example, the invite manager 130 can send, via emails, invitations to meeting devices (e.g., the meeting device 120). As described herein, the invite manager can be caused by the meeting hub 110 to publish a list of potential attendees (e.g., registered users of meeting devices such as the meeting device 120) and information regarding the meeting devices to which the invitations are sent. Although various examples in accordance with the disclosure are not limited to a particular type of the invite manager 130, an example invite manager 130 can refer to MICROSOFT EXCHANGE SERVER™ using MICROSOFT OUTLOOK™, among other invite managers.

In various examples, the first meeting passcode and the second meeting passcode can be communicated in different types of wireless transmissions (e.g., an Electrical and Electronics Engineers (IEEE) 802.11 standard-based transmission such as Wi-Fi including a Wi-Fi HaLow™, the IEEE 802.15 standard-based transmission such as Bluetooth including Bluetooth Low Energy (BLE), the IEEE 802.15.4 standard-based transmission such as Zigbee, and/or a Radio-frequency identification (RFID) transmission) to the meeting hub 110, among other possible types of wireless transmission. For example, the meeting hub 110 can receive the first meeting passcode using a BLE transmission while the meeting hub 110 can send and receive second meeting passcode through non-BLE transmission such as the Wi-Fi transmission.

In various examples, the first meeting passcode and the second meeting passcode can be different. For example, upon being detected by the meeting hub 110, the meeting device 120 can send the first meeting passcode to the meeting hub 110 that the meeting device 120 received along with the invitation to the meeting. Upon receiving the first meeting passcode from the meeting device 120, the meeting hub 110 can generate the second meeting passcode that is different from the first meeting passcode and cause the second meeting passcode to be sent to the meeting device 120, as described herein.

Figure 2:
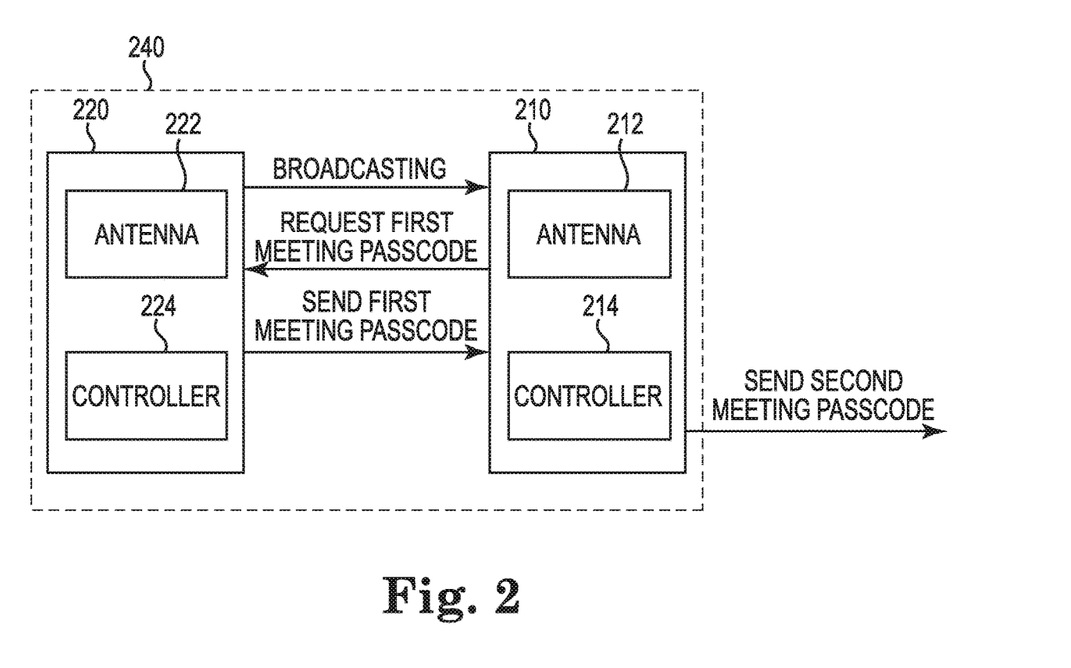
FIG. 2 illustrates a diagram of an example of a communication between a meeting hub and a meeting device according to the disclosure.

FIG. 2 illustrates a diagram of an example communication between a meeting hub and a meeting device according to the disclosure. The meeting hub 210 and the meeting device 220 illustrated in FIG. 2 are analogous to the meeting hub 110 and the meeting device 120 as illustrated in FIG. 1, respectively. As illustrated in FIG. 2, each of the meeting hub 210 and the meeting device 220 can include an antenna and a controller. For example, the meeting hub 210 can include an antenna 212 and a controller 214, and the meeting device 220 can include an antenna 222 and a controller 224 as illustrated in FIG. 2. Each of the meeting hub 210 and the meeting device 220 can use a controller (e.g., a controller 214 and 224), via the antenna (e.g., an antenna 212 and 222), to communicate (e.g., receive and send information) each other as well as with the invite manager (e.g., the invite manager 130).

The antenna (e.g., the antenna 212 and 222) refers to an antenna capable of various types of transmissions by which each component including the antenna can receive and send information. Although examples are not limited to a particular type of transmissions, each of the meeting hub 210 and the meeting device 220 can include an embedded BLE card to receive and send information (e.g., the first and second meeting passcodes and/or the meeting ID as illustrated herein). For example, the meeting device 220 can, via BLE transmission, advertise meeting ID within the communication proximity 240 and the meeting hub 210 can detect the BLE transmission from the meeting device 220. Upon detecting the meeting device 220, the meeting hub 210 may receive information including meeting ID as well as BLE data packet such as manufacturer ID of the meeting device 220. In some examples, the meeting device 220 can, via a RFID transmission, advertise the meeting device 220. In such examples, the meeting hub 210 can detect the RFID transmission from the meeting device 220. In some examples, in response to detecting the RFID transmission from the meeting device 220, the meeting hub 210 can, via different types of wireless transmission such as the Wi-Fi transmission, confirm whether information received via the RFID transmission is valid, as described herein.

In various examples, the controller (e.g., the controller 214, and 224) can be coupled to a memory (not shown), and can be used to communicate with the memory. For example, the controller can communicate with the memory to control data read, write, and erase operations, among other operations. The memory refers to volatile memory and/or non-volatile memory. The volatile memory can include random-access memory (RAM), dynamic random access memory (DRAM), and synchronous dynamic random access memory (SDRAM), among others. Non-volatile memory can include NAND flash memory, NOR flash memory, phase change random access memory (PCRAM), resistive random access memory (RRAM), and magnetic random access memory (MRAM), among others.

As illustrated in FIG. 2, the meeting device 220 can start advertising the meeting device 220 when it is time to start a meeting to which the meeting device 220 is invited. For example, the meeting device 220 can advertise information including a Meeting ID, which the meeting device 220 received along with an invitation, and a Manufacturer ID. However, examples are not limited so. For example, the meeting device 220 may also advertise a first meeting passcode that the meeting device 220 received along with the invitation instead of the Meeting ID. Communication between the meeting hub 210 and the meeting device 220 using the first meeting passcode is described herein.

The meeting hub 210 can detect the meeting device 220 when the meeting device 220 advertises within communication proximity 240 of the meeting hub 210. For example, when the meeting device 220 approaches within the communication proximity 240 (e.g., within a conference room where the meeting hub 210 is located) the meeting hub 210 can receive the information that the meeting device 220 advertises. Meeting hub 210 can authorize the meeting device 220 when the information that the meeting hub 210 received from the meeting device 220 corresponds information received from an invite manager (e.g., the invite manager 130).

In some examples, the meeting device 220 can use information of a Meeting ID to advertise as described herein. The meeting hub 210 can receive the Meeting ID along with the invitation from the invite manager (e.g., the invite manager 130). When the meeting device 220 uses the Meeting ID to advertise within the communication proximity 240, the meeting hub 210 can detect the meeting device 220 and receive the Meeting ID. The meeting hub 210 can confirm whether the Meeting ID received from the meeting device 220 corresponds to the Meeting ID received from the invite manager. For example, the meeting hub 210 can receive information of meeting IDs that were sent to each of meeting devices from the invite manager, and can confirm whether the received meeting ID is on a list published by the invite manager (e.g., the invite manager 130).

Upon confirming that the received meeting ID is on the list, the meeting hub 210 can request the meeting device 220 the first meeting passcode that the meeting device 220 received along with the invitation. For example, when the meeting device 220 sends the first meeting passcode, the meeting hub 210 can confirm whether the first meeting passcode is valid or not. For example, the meeting hub 210 can ask the invite manager (e.g., the invite manager 130) whether the received first meeting passcode is the one that the invite manager previously sent along with the invitation. When the meeting hub 210 confirms that the received first meeting passcode is valid, the meeting hub 210 can cause a second meeting passcode to be sent to the meeting device 220 for another verification, as described herein.

In some examples, the meeting device 220 can use the first meeting passcode to advertise as described herein. When the meeting device 220 advertises using the first meeting passcode within the communication proximity 240, the meeting hub 210 can detect the meeting device 220 and receive the first meeting passcode from the meeting device 220 and confirm whether the received first meeting passcode is valid (e.g., the first meeting passcode received from the meeting device 220 corresponds to one received from the invite manager). Upon confirming that the received first meeting passcode is valid, the meeting hub 210 can cause the second meeting passcode to be sent to the meeting device 220 for another verification, as described herein.

Figure 3:
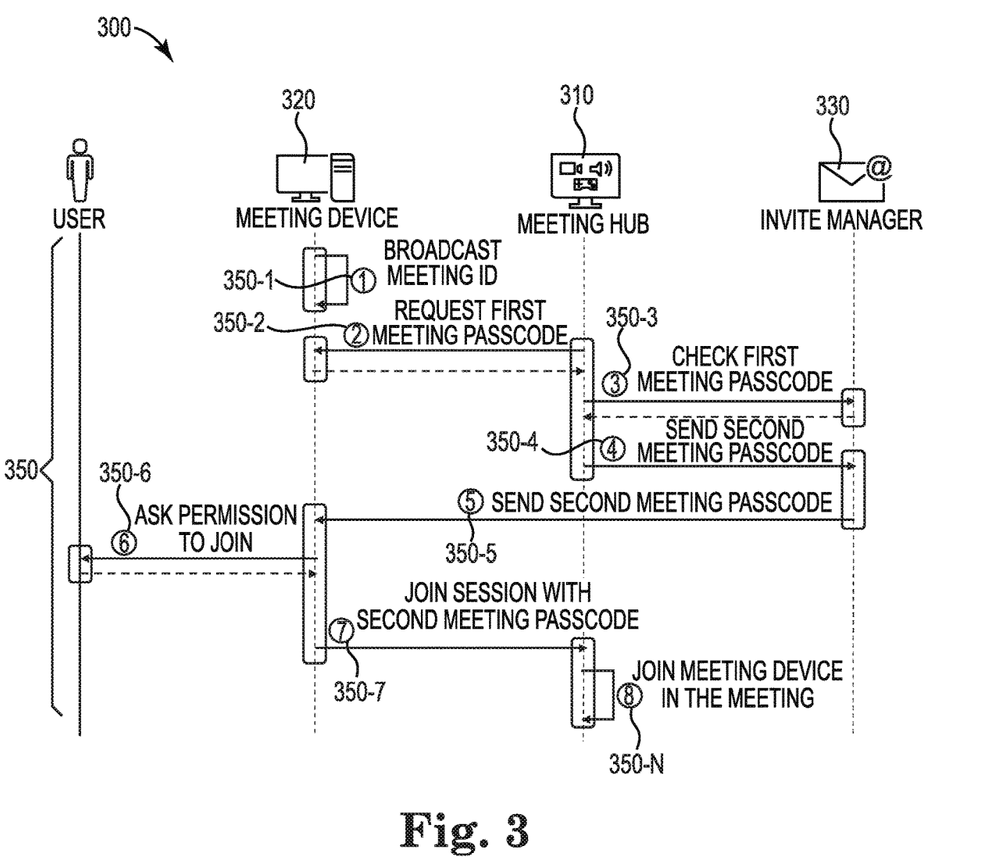
FIG. 3 illustrates a diagram of an example of a method suitable with meeting passcodes according to the disclosure.

FIG. 3 illustrates a diagram of an example of a method suitable with meeting passcodes according to the disclosure. As illustrated in FIG. 3, the method 350 involves system 300 that can include a meeting hub 310, a meeting device 320, and an invite manager 330. The system 300 (e.g., a conference system) can be analogous to that illustrated in FIG. 1, where a meeting hub 310, a meeting device 320, and an invite manager 330 are analogous to meeting hub 110, meeting device 120, and invite manager 130, respectively.

In various examples, methods 350-1 and 350-2 illustrated in FIG. 3 can be analogous to those illustrated in FIG. 2. For example, the meeting device 320 can advertise itself by using information (e.g., the meeting ID as illustrated herein) that the meeting device 320 received along with an invitation. When the meeting device 320 advertises within a communication proximity (e.g., the communication proximity 140 and 240), the meeting hub 310 can detect the meeting device 320, and request a passcode (e.g., the first meeting passcode as illustrated in FIG. 3) upon confirming that the information that the meeting device 320 used to advertise is valid. In another example, though not illustrated in FIG. 3, the meeting device 320 may use the passcode (e.g., the first meeting passcode as illustrated in FIG. 3) to advertise the meeting device 320, and when the meeting device 320 is detected by the meeting hub 310 within the communication proximity (e.g., the communication proximity 140 and 240), the meeting hub 310 may proceed to step 350-3 without requesting the meeting device 320 the passcode (e.g., the first meeting passcode as illustrated in FIG. 3).

Upon receiving the first meeting passcode, the meeting hub 310 can send the first meeting passcode to the invite manager 330 to confirm that the first meeting passcode is valid, as illustrated at 350-3. For example, the invite manager 330 can confirm whether the first meeting passcode received from the meeting hub 310 corresponds to one that the invite manager 330 sent to the meeting hub 310 along with the invitation.

In various examples, the meeting hub 310 can cause the second meeting passcode to be sent to the meeting device 320 upon confirming that the first meeting passcode is valid. For example, as illustrated at 350-4, the meeting hub 310 can send the second meeting passcode to the invite manager 330, which then can send the second meeting passcode to the meeting device 320. In various examples, the second meeting passcode can be generated by the meeting hub 310 upon confirming that the first meeting passcode is valid. Therefore, until the invite manager 330 receives the second meeting passcode from the meeting hub 310 (e.g., receiving the second meeting passcode at step 350-4), the invite manager 330 may not be in possession of the second meeting passcode.

As illustrated at 350-5, the invite manager 330 can send the second meeting passcode to the meeting device 320 upon receiving the second meeting passcode from the meeting hub 310. As described herein, the meeting device 320 can, via execution of instructions installed in and/or downloaded to the meeting device 320, provide a notification to a user that the meeting device 320 received the second meeting passcode, and request for authorizing the meeting device 320 to join the meeting. Although the meeting device 320 is not limited to a particular method of obtaining the authorization from the user, the meeting device 320 can ask the user whether to join the meeting or not. For example, the meeting device 320 can obtain the authorization from the user to join the meeting when the user selects "join" on a display of the meeting device 320.

In various examples, the invite manager 330 can send the second meeting passcode to those invited meeting devices, not to other uninvited meeting devices. For example, when the meeting device 320 accepts the invitation to the meeting, the invite manager 330 can create an invitation list where the invited meeting device 320 can be added as a valid invitee. By causing the invite manager 330 to send the second meeting passcode to the meeting device 320 that is listed as the valid invitee, the meeting hub 310 can assure that other devices not invited to the meeting cannot join the meeting by using the second meeting passcode.

In various examples, as illustrated herein, the meeting hub 310 can cause the invite manager 330 to send different meeting IDs to each corresponding meeting devices (e.g., the meeting device 320) invited to the meeting. For example, the meeting hub 310 can send a first meeting ID to a first invited meeting device, and a second invited meeting ID to a second invited meeting device. By doing so, each of the number of invited meeting devices can receive a particular meeting ID that is different from other meeting IDs received by other meeting devices. When sending the second meeting passcode, the meeting hub 310 can also send a particular meeting ID received from the meeting device (e.g., the meeting device 320). For example, the meeting hub 310 can send the first meeting ID received from the first invited meeting device along with the second meeting passcode to the invite manager 330 upon confirming that the first meeting passcode received from first invited meeting device is valid, as described herein. Upon receiving the second meeting passcode along with the first meeting ID, the invite manager 330 can send the second meeting passcode to a particular meeting device corresponding to the first meeting ID. Put another way, the invite manager can send the second meeting passcode to those invited meeting devices detected within the communication proximity and authenticated by the meeting hub 310.

As illustrated at 350-7, the meeting device 320 can send the second meeting passcode to the meeting hub 310 upon receiving authorization to join the meeting. When the meeting hub 310 receives the second meeting passcode as illustrated at 350-7, the meeting hub 310 can confirm whether the second meeting passcode received from the meeting device 320 is valid or not. For example, the meeting hub 310 can proceed to confirm whether the received second meeting passcode corresponds to the second meeting passcode that the meeting hub 310 generated and caused the invite manager 330 to send to the meeting device 320. Upon confirming that the received second meeting passcode is valid, the meeting hub 310 can admit the meeting device 320 to the meeting, as illustrated at 350-N. As used herein, being admitted to the meeting can refer to being admitted to and waiting for a meeting (e.g., admitted to a waiting room of the meeting) and/or being admitted to a live in-progress meeting (e.g., admitted to a meeting room of the meeting).

However, examples are not limited to those methods as illustrated in 350. For example, the meeting hub 310 can generate other meeting passcodes beyond the second meeting passcode to confirm that the meeting device 320 received the invitation to the meeting. For example, the meeting hub 310 can generate a third meeting passcode and cause the third meeting passcode to, via the invite manager 330, be sent to the meeting device 320, which then send to the meeting hub 310.

Figure 4:
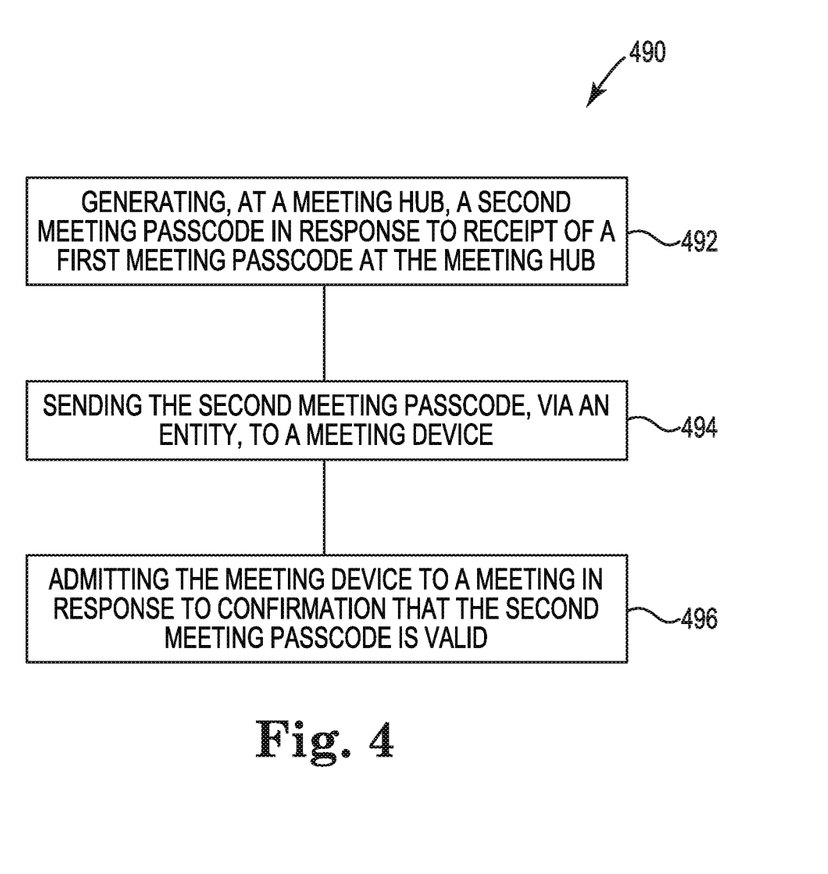
FIG. 4 illustrates a flow diagram of an example of a method suitable with meeting passcodes according to the disclosure.

FIG. 4 illustrates a flow diagram of an example of a method 490 of meeting passcodes according to the disclosure. As illustrated at 492, the method 490 can include generating, at a meeting hub, a second meeting passcode in response to receipt of a first meeting passcode at the meeting hub. The meeting hub is analogous to the meeting hub, as illustrated in FIGS. 1, 2, and 3. In various examples, the first meeting passcode can be received from a meeting device that is analogous to the meeting device, as illustrated in FIGS. 1, 2, and 3.

In various examples, the meeting hub can generate the second meeting passcode when the meeting hub confirms that the received first meeting passcode is valid, as illustrated herein. For example, the meeting hub can confirm whether the received first meeting passcode corresponds to the first meeting passcode the meeting sent to the meeting device.

The method 490 can include sending the second meeting passcode, via an entity, to a meeting device, as illustrated at 494. For example, upon generating the second meeting passcode, the meeting hub can send the second meeting passcode to the entity, and the entity can send the second meeting passcode to the meeting device. As described herein, the entity can be the invite manager (e.g., the invite manager 330), as described herein. Upon receiving the second meeting passcode at the meeting device, the meeting device can ask the user whether to join the meeting, as described herein. Upon receiving the authorization to join the meeting, the meeting device can send the second meeting passcode to the meeting hub.

As illustrated at 496, the method 490 can include admitting the meeting device (e.g., the meeting device 120, 220, and 320) to a meeting in response to confirmation that the second meeting passcode is valid. For example, the meeting hub can receive the second meeting passcode from the meeting device, and confirm whether the received second meeting passcode corresponds to the second meeting passcode that the meeting hub generated and sent, via the entity, to the meeting device. Upon confirmation that the received second meeting passcode corresponds, the meeting hub can admit the meeting device to the meeting.

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A meeting hub, comprising:
   an antenna; and
   a controller coupled to the antenna to:
   receive, from an invite manager, a first meeting ID for a meeting;
   detect that a meeting device is in a wireless communication proximity of the meeting hub, and receive a second meeting ID from the meeting device in the wireless communication proximity, the second meeting ID received by the meeting device along with an invitation for the meeting from the invite manager;
   confirm that the second meeting ID from the meeting device is a same meeting ID as the first meeting ID received from the invite manager;
   in response to the confirmation, request, via the antenna from the meeting device in the wireless communication proximity, a first meeting passcode received by the meeting device along with the invitation for the meeting;
   wirelessly receive, via the antenna, the first meeting passcode from the meeting device in response to the request;
   generate a second meeting passcode in response to receipt of the first meeting passcode;
   cause the second meeting passcode to be sent to a user of the meeting device; and
   admit the meeting device to the meeting based on receipt of the second meeting passcode from the meeting device.

2. The meeting hub of claim 1, wherein the meeting hub is to receive the first meeting passcode and the second meeting passcode in different types of transmissions to the meeting hub.

3. The meeting hub of claim 1, wherein the controller is to, via the antenna, cause an entity that is different from the meeting hub to send the second meeting passcode to the meeting device.

4. The meeting hub of claim 3, wherein the controller is to, via the antenna, send the second meeting passcode to the entity and cause the second meeting passcode to be sent to the user of the meeting device via the entity.

5. The meeting hub of claim 1, wherein the first meeting passcode and the second meeting passcode are different.

6. The meeting hub of claim 1, wherein the meeting hub is to wirelessly receive the first meeting passcode via a Bluetooth Low Energy transmission.

7. The meeting hub of claim 1, wherein the controller is to, via the antenna, authorize the meeting device to be admitted to the meeting upon receiving the second meeting passcode from the meeting device.

8. A meeting device, comprising:
an antenna; and
a controller coupled to the antenna to:
receive a first meeting ID and a first meeting passcode along with an invitation for a meeting, the invitation being from an invite manager;
send, via the antenna to a meeting hub when the meeting device is in wireless communication proximity with the meeting hub, the first meeting ID;
send, via the antenna, the first meeting passcode to the meeting hub in response to a request from the meeting hub, the request sent by the meeting hub responsive to a confirmation that the first meeting ID sent by the meeting device to the meeting hub is a same meeting ID as a second meeting ID received by the meeting hub from the invite manager;
receive a second meeting passcode from the meeting hub in response to a confirmation by the meeting hub that the first meeting passcode is valid;
request an authorization from a user of the meeting device, the authorization to authorize the meeting device to send the second meeting passcode to the meeting hub;
send the second meeting passcode to the meeting hub in response to the authorization; and
join the meeting responsive to admission of the meeting device to the meeting by the meeting hub.

9. A method, comprising:
wirelessly receiving, by a meeting hub from an invite manager, a first meeting ID for a meeting;
receiving, by the meeting hub from a meeting device in a wireless communication proximity with the meeting hub, a second meeting ID, the second meeting ID received by the meeting device along with an invitation for the meeting from the invite manager;
confirming, by the meeting hub, that the second meeting ID from the meeting device is a same meeting ID as the first meeting ID received from the invite manager;
in response to the confirmation, requesting, by the meeting hub from the meeting device in the wireless communication proximity, a first meeting passcode received by the meeting device along with the invitation for the meeting;
wirelessly receiving, by the meeting hub from the meeting device, the first meeting passcode from the meeting device in response to the request;
in response to the receiving of the first meeting passcode, generating, at the meeting hub, a second meeting passcode that is different from the first meeting passcode;
sending the second meeting passcode, via an entity, to the meeting device;
wirelessly receiving, by the meeting hub after the sending of the second meeting passcode, the second meeting passcode from the meeting device; and
admitting, by the meeting hub, the meeting device to the meeting in response to a confirmation that the second meeting passcode received from the meeting device is valid.

10. The method of claim 9, further comprising:
confirming that the meeting device previously received the invitation to join the meeting.

11. The method of claim 10, wherein confirming that the meeting device previously received the invitation to join the meeting comprises transmitting the first meeting passcode to the invite manager to confirm that the first meeting passcode is valid.

12. The meeting hub of claim 1, wherein the controller is to generate the second meeting passcode in response to confirming that the first meeting passcode is valid.

13. The meeting hub of claim 1, wherein the controller is to cause the invite manager to send the second meeting passcode to the meeting device.

14. The meeting hub of claim 13, wherein the controller is to send the second meeting passcode to the invite manager to cause the invite manager to send the second meeting passcode to the meeting device.

15. The meeting hub of claim 13, wherein the controller is to:
responsive to the receipt of the first meeting passcode from the meeting device, send the first meeting passcode to the invite manager;
receive, from the invite manager, confirmation of a validity of the first meeting passcode; and
generate the second meeting passcode in response to the confirmation of the validity of the first meeting passcode.

16. The method of claim 9, wherein the entity is the invite manager that sent the invitation.

17. The method of claim 16, further comprising:
sending, by the meeting hub, the second meeting passcode to the invite manager to cause the invite manager to send the second meeting passcode to the meeting device.

18. The meeting device of claim 8, wherein the first meeting passcode and the second meeting passcode are different.

* * * * *